United States Patent
Hong et al.

(10) Patent No.: US 11,937,269 B2
(45) Date of Patent: Mar. 19, 2024

(54) METHOD AND DEVICE FOR TRANSMITTING AND RECEIVING AUXILIARY INFORMATION IN NR V2X

(71) Applicant: LG ELECTRONICS INC., Seoul (KR)

(72) Inventors: Jongwoo Hong, Seoul (KR); Youngdae Lee, Seoul (KR); Seoyoung Back, Seoul (KR); Giwon Park, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/095,462

(22) Filed: Jan. 10, 2023

(65) Prior Publication Data

US 2023/0141004 A1     May 11, 2023

Related U.S. Application Data

(63) Continuation of application No. PCT/KR2021/014291, filed on Oct. 15, 2021.

(30) Foreign Application Priority Data

| Oct. 15, 2020 | (KR) | 10-2020-0133565 |
| Oct. 21, 2020 | (KR) | 10-2020-0136866 |
| May 13, 2021  | (KR) | 10-2021-0061868 |

(51) Int. Cl.
*H04W 72/25* (2023.01)
*H04W 52/02* (2009.01)
(Continued)

(52) U.S. Cl.
CPC ....... *H04W 72/25* (2023.01); *H04W 52/0229* (2013.01); *H04W 72/02* (2013.01);
(Continued)

(58) Field of Classification Search
CPC . H04W 72/25; H04W 52/0229; H04W 72/02; H04W 72/1263; H04W 76/23; H04W 76/28
See application file for complete search history.

(56) References Cited

U.S. PATENT DOCUMENTS

| 2020/0037343 | A1  | 1/2020 | He et al. |
| 2021/0227602 | A1* | 7/2021 | Li .................... H04W 72/0446 |
| 2022/0046602 | A1* | 2/2022 | Hosseini ............... H04W 28/26 |

OTHER PUBLICATIONS

Fraunhofer HHI et al., "Resource Allocation Enhancements for Mode 2," 3GPP TSG-RAN WG1 Meeting #102-e, R1-2005537, Aug. 2020, 10 pages.

(Continued)

*Primary Examiner* — Ayanah S George
(74) *Attorney, Agent, or Firm* — LEE, HONG, DEGERMAN, KANG & WAIMEY

(57) ABSTRACT

Provided are a method by which a first device performs wireless communication, and a device supporting same. The method may comprise the steps of: receiving sidelink control information (SCI) including scheduling information for a physical sidelink shared channel (PSSCH) from a second device through a physical sidelink control channel (PSCCH), wherein the SCI includes information related to frequency resource allocation, information related to time resource allocation, information related to a demodulation reference signal (DMRS) pattern, and information related to a modulation and coding scheme (MCS); receiving first auxiliary information from the second device through the PSSCH; selecting at least one sidelink (SL) resource on the basis of at least one of at least one SCI or the first auxiliary information; performing resource reselection for the at least one SL resource; and transmitting an auxiliary information request to the second device on the basis of the resource reselection.

20 Claims, 18 Drawing Sheets

(51) Int. Cl.
    *H04W 72/02*      (2009.01)
    *H04W 72/1263*    (2023.01)
    *H04W 76/23*      (2018.01)
    *H04W 76/28*      (2018.01)

(52) U.S. Cl.
    CPC ....... *H04W 72/1263* (2013.01); *H04W 76/23* (2018.02); *H04W 76/28* (2018.02)

(56) References Cited

OTHER PUBLICATIONS

Huawei, HiSilicon et al., "Sidelink resource allocation to reduce power consumption," 3GPP TSG-RAN WG1 Meeting #102-e, R1-2006401, Aug. 2020, 7 pages.
Samsung, "On Mode 2 for NR Sidelink," 3GPP TSG-RAN WG1 #100bis-e, R1-2002126, Apr. 2020, 10 pages.
NEC, "Views on resource allocation for power saving," 3GPP TSG-RAN WG1 #102-e, R1-2005762, Aug. 2020, 7 pages.
PCT International Application No. PCT/KR2021/014291, International Search Report dated Jan. 20, 2022, 4 pages.

\* cited by examiner

METHOD AND DEVICE FOR TRANSMITTING AND RECEIVING AUXILIARY INFORMATION IN NR V2X

CROSS-REFERENCE TO RELATED APPLICATION(S)

This application is a continuation of International Application No. PCT/KR2021/014291, filed on Oct. 15, 2021, which claims the benefit of earlier filing date and right of priority to Korean Patent Application Nos. 10-2020-0133565, filed on Oct. 15, 2020, 10-2020-0136866, filed on Oct. 21, 2020, and 10-2021-0061868, filed on May 13, 2021, the contents of which are hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, if the UE-A frequently transmits an inter-UE coordination message, the use of resources for the transmission may increase, and thus interference may occur. Furthermore, power consumption of the UE-A for the transmission may also occur. Furthermore, since the UE-A cannot perform reception while the UE-A transmits a message (due to a half-duplex problem), a problem in which reception efficiency of the UE-A deteriorates may occur.

In one embodiment, provided is a method for performing wireless communication by a first device. The method may comprise: receiving, from a second device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); receiving, from the second device through the PSSCH, first assistance information; selecting at least one sidelink (SL) resource based on at least one of the first assistance information or at least one SCI; performing resource reselection for the at least one SL resource; and transmitting, to the second device, an assistance information request based on the resource reselection.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: receive, from a second device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); receive, from the second device through the PSSCH, first assistance information; select at least one sidelink (SL) resource based on at least one of the first assistance information or at least one SCI; perform resource reselection for the at least one SL resource; and transmit, to the second device, an assistance information request based on the resource reselection.

The UE can efficiently perform SL communication.

DETAILED DESCRIPTION

Figure 1:
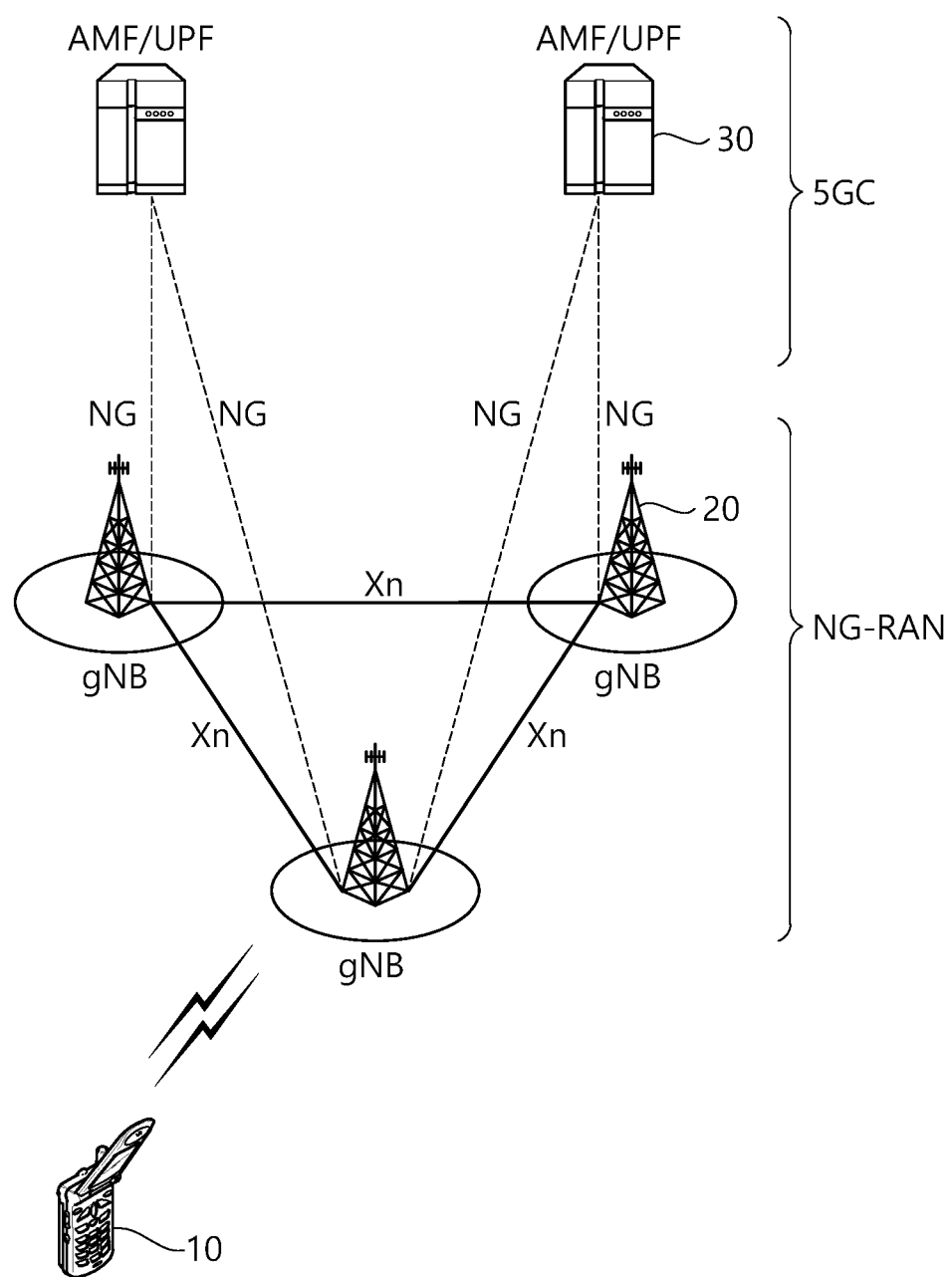
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the documents in Table 1 below may be referred to.

TABLE 1

| 3GPP LTE | 3GPP NR(e.g. 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214. Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | |
| 3GPP TS 36.314: Layer 2 - Measurements | 3GPP TS 38.300: Overall description |
| 3GPP TS 36.321: Medium Access Control (MAC) protocol | 3GPP TS 38.304: User Equipment (UE) procedures in idle mode and in RRC inactive state |
| 3GPP TS 36.322 Radio Link Control | |

TABLE 1-continued

| 3GPP LTE | 3GPP NR(e.g. 5G) |
|---|---|
| (RLC) protocol<br>3GPP TS 36.323: Packet Data Convergence Protocol (PDCP)<br>3GPP TS 36.331: Radio Resource Control (RRC) protocol | 3GPP TS 38.321: Medium Access Control (MAC) protocol<br>3GPP TS 38.322: Radio Link Control (RLC) protocol<br>3GPP TS 38.323: Packet: Data Convergence Protocol (PDCP)<br>3GPP TS 38.331: Radio Resource Control (RRC) protocol<br>3GPP TS 37.324: Service Data Adaptation Protocol (SDAP)<br>3GPP TS 37.340: Multi-connectivity; Overall description |

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
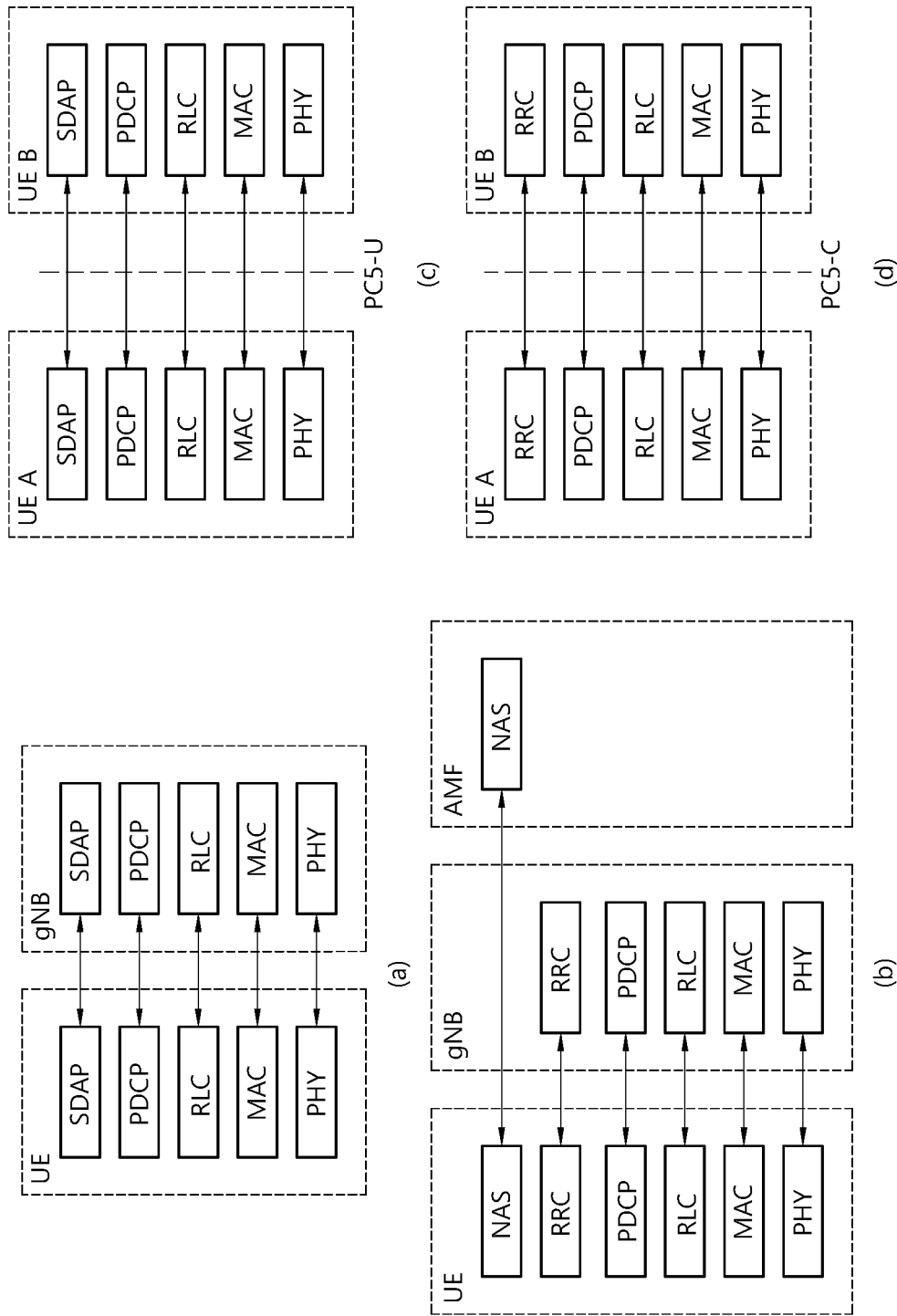
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
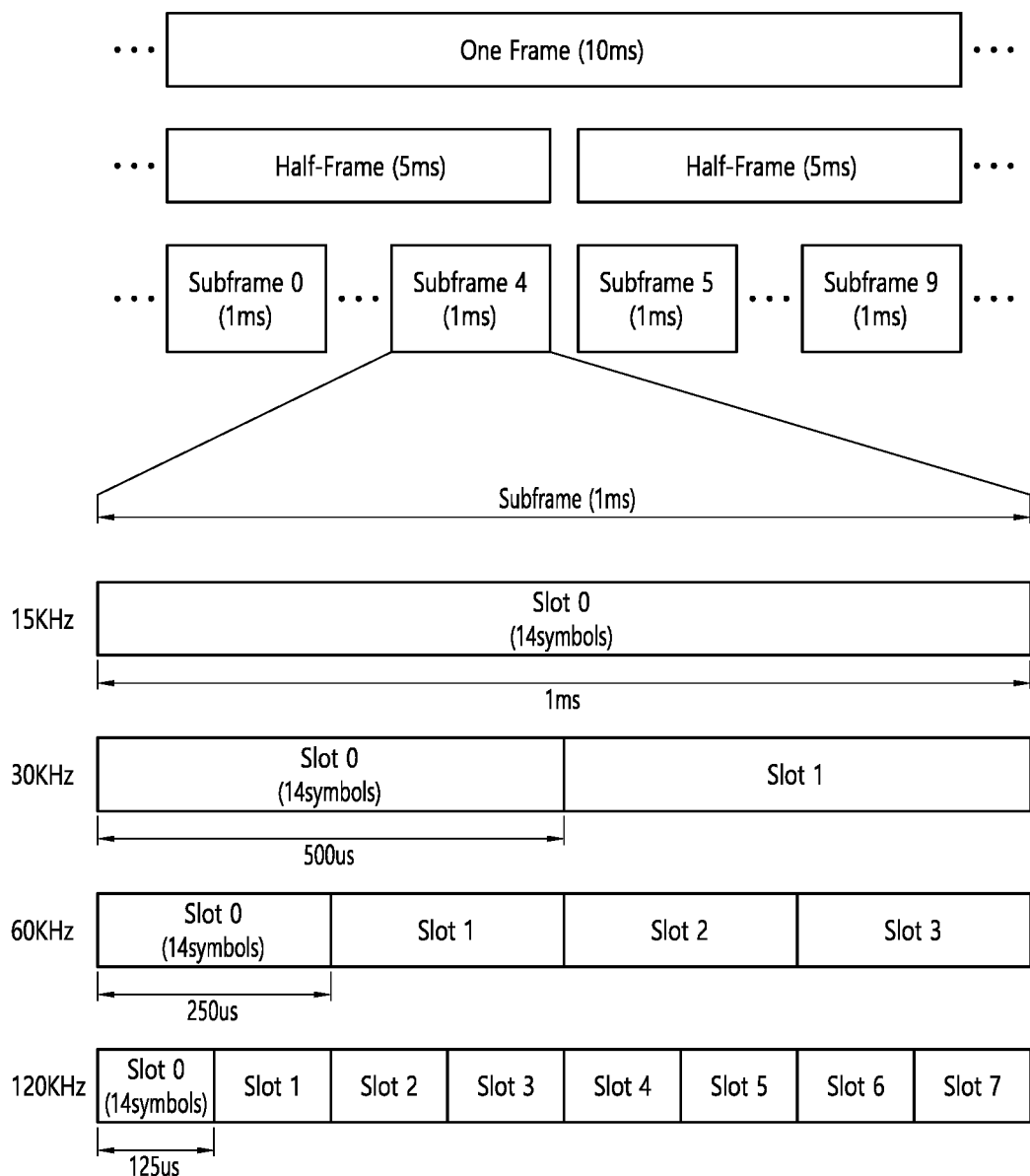
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 3 shows an example of a number of symbols per slot, a number of slots per frame, and a number of slots per subframe based on the SCS, in a case where an extended CP is used.

TABLE 3

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
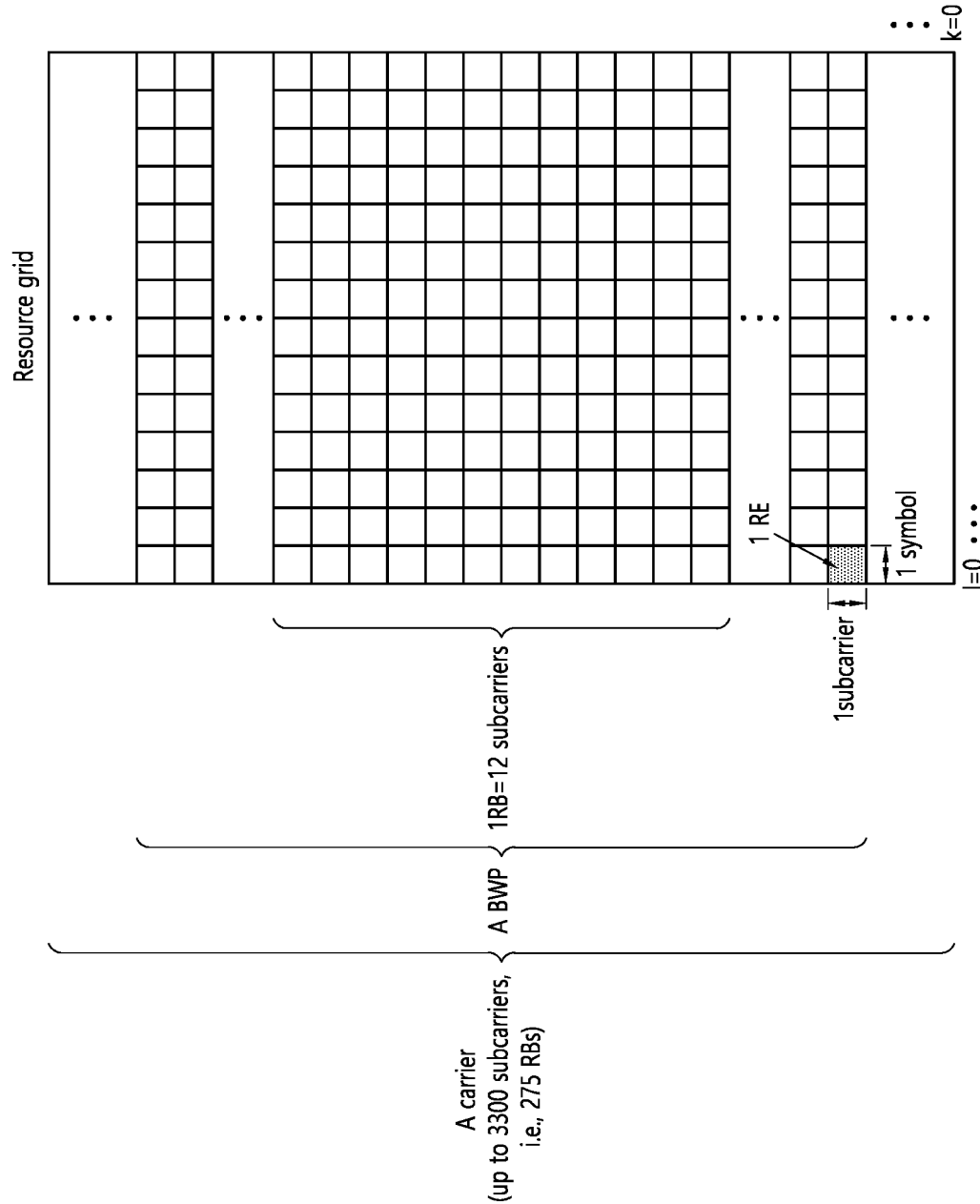
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
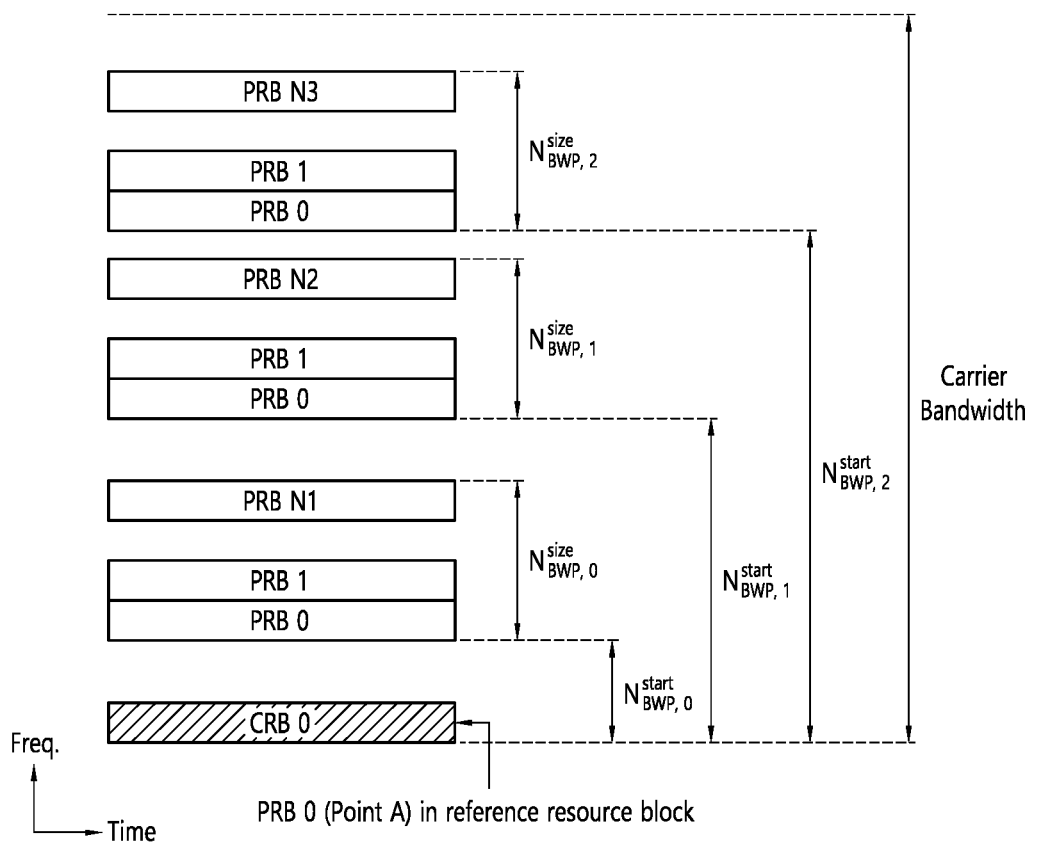
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
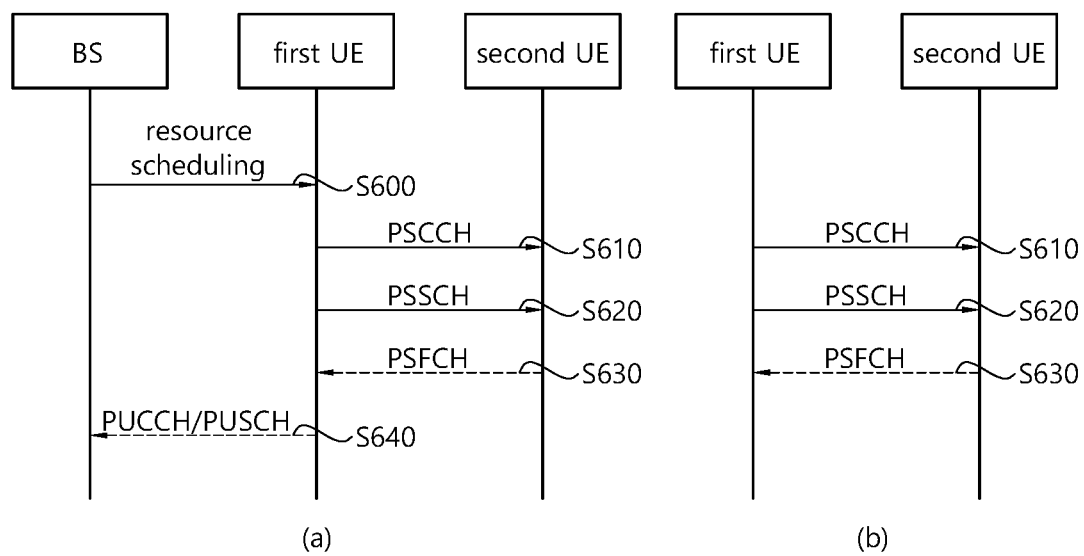
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Tables 6-7 show an example of the $1^{st}$-stage SCI format.

TABLE 6

8.3.1.1 SCI format 1-A
SCI format 1-A is used for the scheduling of PSSCH and $2^{nd}$-stage-SCI on PSSCH
The following information is transmitted by means of the SCI format 1-A:
- Priority—3 bits as specified in clause 5.4.3.3 of [12, TS 23.287] and clause 5.22.1.3.1 of [8, TS 38.321].

- Frequency resource assignment— $\left\lceil \log_2\left(\frac{N^{SL}_{subChannel}(N^{SL}_{subchannel}+1)}{2}\right) \right\rceil$ bits when the value of the higher layer parameter sl-MaxNumPerReserve is configured to 2; otherwise $\left\lceil \log_2\left(\frac{N^{SL}_{subChannel}(N^{SL}_{subChannel}+1)(2N^{SL}_{subChannel}+1)}{6}\right) \right\rceil$ bits when the value of the higher layer parameter sl-MaxNumPerReserve is configured to 3, as defined in clause 8.1.2.2 of [6, TS 38.214].

TABLE 6-continued

- Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].
- Resource reservation period—$\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.
- DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
- $2^{nd}$-stage SCI format—2 bits as defined in Table 7.
- Beta_offset indicator—2 bits as provided by higher layer parameter sl-BetaOffsets2ndSCI and Table 8.3.1.1-2.
- Number of DMRS port—1 bit as defined in Table 8.3.1.1-3.
- Modulation and coding scheme—5 bits as defined in clause 8.1.3 of [6, TS 38.214].
- Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
- PSFCH overhead indication—1 bit as defined clause 8.1.3.2 of [6, TS 38.214] if higher layer parameter sl-PSFCH-Period = 2 or 4; 0 bit otherwise.
- Reserved—a number of bits as determined by higher layer parameter sl-NumReservedBits, with value set to zero.

TABLE 7

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Tables 8-9 show an example of the $2^{nd}$-stage SCI format.

TABLE 8

8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator - 1 bit as defined in clause 16.3 of [5, TS 38.213].
Cast type indicator - 2 bits as defined in Table 9.
CSI request - 1 bit as defined in clause 8.2.1 of [6, TS 38.214].
8.4.1.2 SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
HARQ process number - 4 bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].
HARQ feedback enabled/disabled indicator- 1 bit as defined in clause 16.3 of [5, TS 38.213].
Zone ID - 12 bits as defined in clause 5.8.11 of [9, TS 38.331].
Communication range requirement - 4 bits determined by higher layer parameter sl-ZoneConfigMCR-Index.

TABLE 9

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
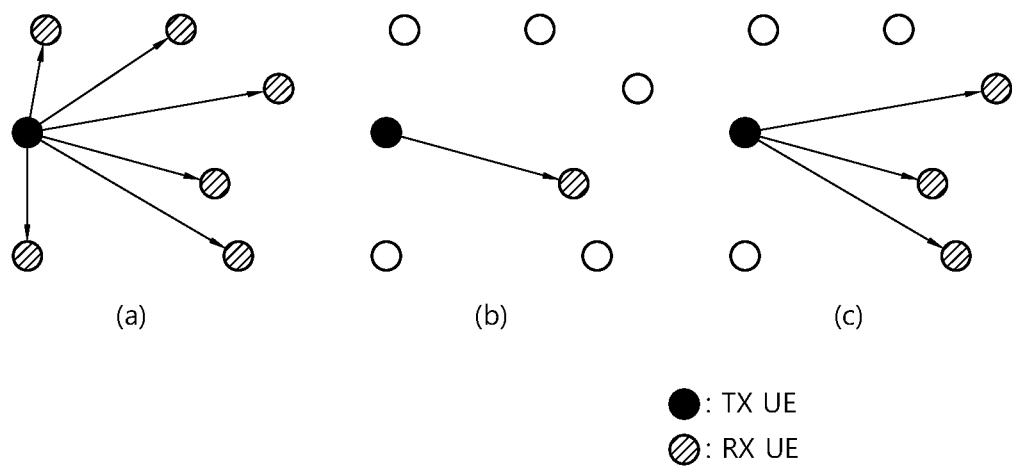
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Table 10 shows an example of SL CBR and SL RSSI.

TABLE 10

SL CBR

| | |
|---|---|
| Definition | SL Channel Busy Ratio (SL CBR) measured in slot n is defined as the portion of sub-channels in the resource pool whose SL RSSI measured by the UE exceed a (pre-) configured threshold sensed over a CBR measurement window [n − a, n − 1], wherein a is equal to 100 or 100 · $2^\mu$ slots, according to higher layer parameter timeWindowSize-CBR. |

TABLE 10-continued

| | |
|---|---|
| Applicable for | RRC_IDLE intra-frequency,<br>RRC_ IDLE inter-frequency,<br>RRC_CONNECTED intra-frequency,<br>RRC_CONNECTED inter-frequency |

SL RSSI

| | |
|---|---|
| Definition | Sidelink Received Signal Strength indicator (SL RSSI) is defined as the linear average of the total received power (in [W]) observed in the configured sub-channel in OFDA symbols of a slot configured for PSCCH and PSSCH, starting from the $2^{nd}$ OFDM symbol.<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reporter SL RSSI value shall not be lower than the corresponding SL RSSI of any of the individual receiver branches. |
| Applicable for | RRC_IDLE intra-frequency,<br>RRC_ IDLE inter-frequency,<br>RRC_CONNECTED intra-frequency,<br>RRC_CONNECTED inter-frequency |

Referring to Table 10, the slot index may be based on a physical slot index.

Table 11 shows an example of SL Channel Occupancy Ratio (CR).

TABLE 11

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency,<br>RRC_ IDLE inter-frequency,<br>RRC_CONNECTED intra-frequency,<br>RRC_CONNECTED inter-frequency |

NOTE 1:
a is a positive integer and b is 0 or a positive integer; a and b are determined by UE implementation with a + b + 1 = 1000 or 1000 · $2^\mu$ slots, according to higher layer parameter timeWindowSite-CR, b < (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + b] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 [7].

Meanwhile, an inter-UE coordination operation may be supported in NR V2X. For example, in inter-UE coordination, a UE-A may determine a set of resources, and the UE-A may transmit the set to a UE-B in the resource allocation mode 2. In addition, the UE-B may consider the set for resource selection for its own transmission. For example, according to inter-UE coordination, the UE may inform other UEs of information related to preferred resource(s) or information related to non-preferred resource(s) (hereinafter, it is referred to as a candidate resource or a recommended resource) in the form of assistance information. For example, upon receiving information related to an excluding resource and/or a candidate resource, the UE may select its own transmission resource in consideration of the excluding resource and/or the candidate resource.

For example, in order to assist a sensing operation and/or a resource selection operation of a first UE, a second UE may transmit assistance information. The first UE may use the assistance information received from the second UE, in order to improve PSSCH detection performance and/or reduce half-duplex limit and/or select a reserve resource for transmitting and receiving a specific signal. In an embodiment of the present disclosure, for convenience of description, it is assumed that the UE-A transmits assistance information to the UE-B. It is assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

Figure 8:
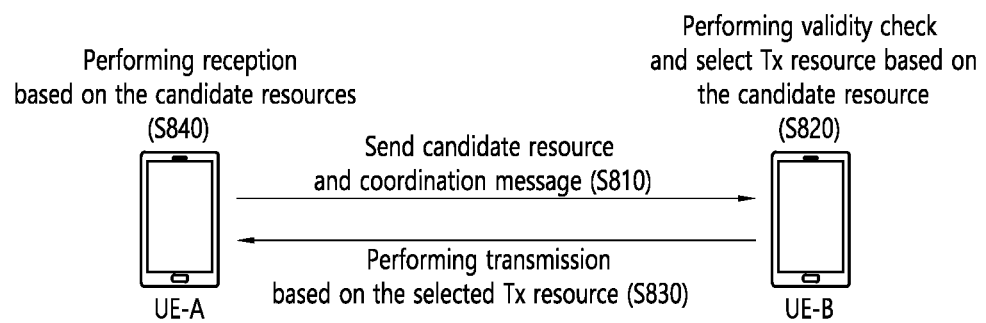
FIG. 8 shows a procedure for a UE-A to transmit assistance information to a UE-B, based on an embodiment of the present disclosure.

FIG. 8 shows a procedure for a UE-A to transmit assistance information to a UE-B, based on an embodiment of the present disclosure. The embodiment of FIG. 8 may be combined with various embodiments of the present disclosure.

Referring to FIG. 8, in step S810, the UE-A may transmit assistance information to the UE-B. In step S820, the UE-B may select a resource for PSCCH/PSSCH based on the assistance information received from the UE-A. In step S830, the UE-B may perform SL transmission by using the resource. For example, the UE-B may select a resource for PSCCH/PSSCH to be transmitted to the UE-A based on the assistance information received from the UE-A, and the UE-B may perform SL transmission by using the resource. For example, the UE-B may select a resource for PSCCH/PSSCH to be transmitted to the UE-C based on the assistance information received from the UE-A, and the UE-B may perform SL transmission by using the resource. In step S840, the UE-A or the UE-C may perform SL reception on the resource determined based on the assistance information.

As described above, the UE-A may transmit information related to recommended resource(s) and/or candidate resource(s) to the UE-B, and the UE-B may select a transmission resource based on the received resource information. In this situation, in case that the UE-A transmits information related to excluding resource(s) and/or candidate resource(s) based on a coordination message, a method for efficiently transmitting the corresponding information and a device supporting the same may be required. For example, if the UE-A frequently transmits an inter-UE coordination message, the use of resources for the transmission may increase, and thus interference may occur. Furthermore, power consumption of the UE-A for the transmission may also occur. Furthermore, since the UE-A cannot perform reception while the UE-A transmits a message (due to a half-duplex problem), a problem in which reception efficiency of the UE-A deteriorates may occur. In the present disclosure, an efficient operation of the UE is defined based on this problem. In the present disclosure, the coordination message may be referred to by various terms such as an inter-UE coordination message, inter-UE coordination information, assistance information, a candidate message, etc.

Based on various embodiments of the present disclosure, a method for the UE-A and the UE-B to perform SL communication based on assistance information and a device supporting the same are proposed.

Based on an embodiment of the present disclosure, the UE-A may transmit an inter-UE coordination message for inter-UE coordination. For example, the message may include the following two types of information (e.g., excluding resource(s) and/or candidate resource(s)). For example, the UE-A may transmit the inter-UE coordination message to the UE-B through a physical layer signal or a higher layer signal. Herein, for example, for excluding resource(s) and/or candidate resource(s), resources may be configured separately. Or, for example, excluding resource(s) and/or candidate resource(s) may be configured by one resource (indication). If the resources are configured separately, information representing whether an indicated resource is an excluding resource or a candidate resource may be included/transmitted. Or, for example, whether an indicated resource is an excluding resource or a candidate resource may be recognized through information itself Case 1) By recommending excluding transmission resource(s) to the UE-B, the UE-B performs transmission by selecting other transmission resources except for the excluding resource(s) (based on sensing or based on random selection), and/or Case 2) By recommending selection of transmission resource(s) to the UE-B, the UE-B performs transmission by selecting a transmission resource included in the candidate resource(s) (based on sensing or based on random selection)

Based on an embodiment of the present disclosure, after the UE-A knows that the UE-B performs power saving (in unicast) (through a PC5 connection) or after the UE-B notifies the UE-A to perform a power saving operation, all or partial resource information of the UE-B may be transmitted. In this case, the UE-A may perform the following procedure.

If the UE-B performs random selection, the UE-B may request all sensing results from the UE-A.

If the UE-B performs partial sensing, the UE-B may request a sensing result of a resource region in which the UE-B does not perform sensing from the UE-A.

The UE-A may transmit all or partial sensing results of the UE-A to the UE-B through an inter-UE coordination message together with information related to excluding resource(s) and/or candidate resource(s).

Based on an embodiment of the present disclosure, when the UE-A performs transmission based on groupcast or broadcast (in groupcast or broadcast), if the UE-A determines that receiving UEs need to perform a power saving operation, the UE-A may perform the following operation.

If it is determined that a channel state between the UE-A and the receiving UEs is good and there is no mobility (e.g., high RSRP), the UE-A may transmit all or partial sensing results of the UE-A together with information related to excluding resource(s) and/or candidate resource(s) through an inter-UE coordination message.

For UEs performing power saving, the UE-A may transmit all or partial sensing results through an inter-UE coordination message together with information related to excluding resource(s) and/or candidate resource(s) in periodically determined time slots.

For example, in the procedure in which the UE-A transmits the aforementioned inter-UE coordination message, if inter-UE coordination information transmitted by neighboring UEs is the same as information to be transmitted by the UE-A, the UE-A may save power by skipping transmission even if it is configured to perform (periodic or event-based) transmission.

Figure 9:
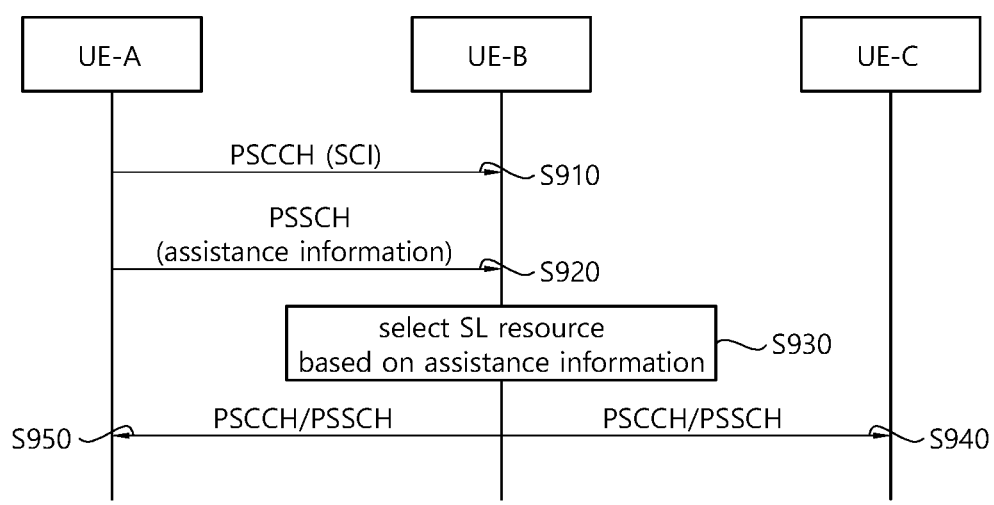
FIG. 9 shows a procedure for a UE to perform SL communication based on assistance information, based on an embodiment of the present disclosure.

FIG. 9 shows a procedure for a UE to perform SL communication based on assistance information, based on an embodiment of the present disclosure. The embodiment of FIG. 9 may be combined with various embodiments of the present disclosure.

Referring to FIG. 9, in step S910, the UE-B may receive SCI from the UE-A through a PSCCH. For example, the SCI may include information for scheduling a PSSCH. In step S920, the UE-B may receive assistance information from the UE-A through the PSSCH. For example, the assistance information may be included in a MAC PDU. For example, the assistance information may include information proposed in various embodiments of the present disclosure. In step S930, the UE-B may select an SL resource based on the assistance information.

In step S940, the UE-B may transmit a PSCCH and/or a PSSCH to the UE-C based on the selected SL resource. Alternatively/additionally, in step S950, the UE-B may transmit a PSCCH and/or a PSSCH to the UE-A based on the selected SL resource.

Figure 10:
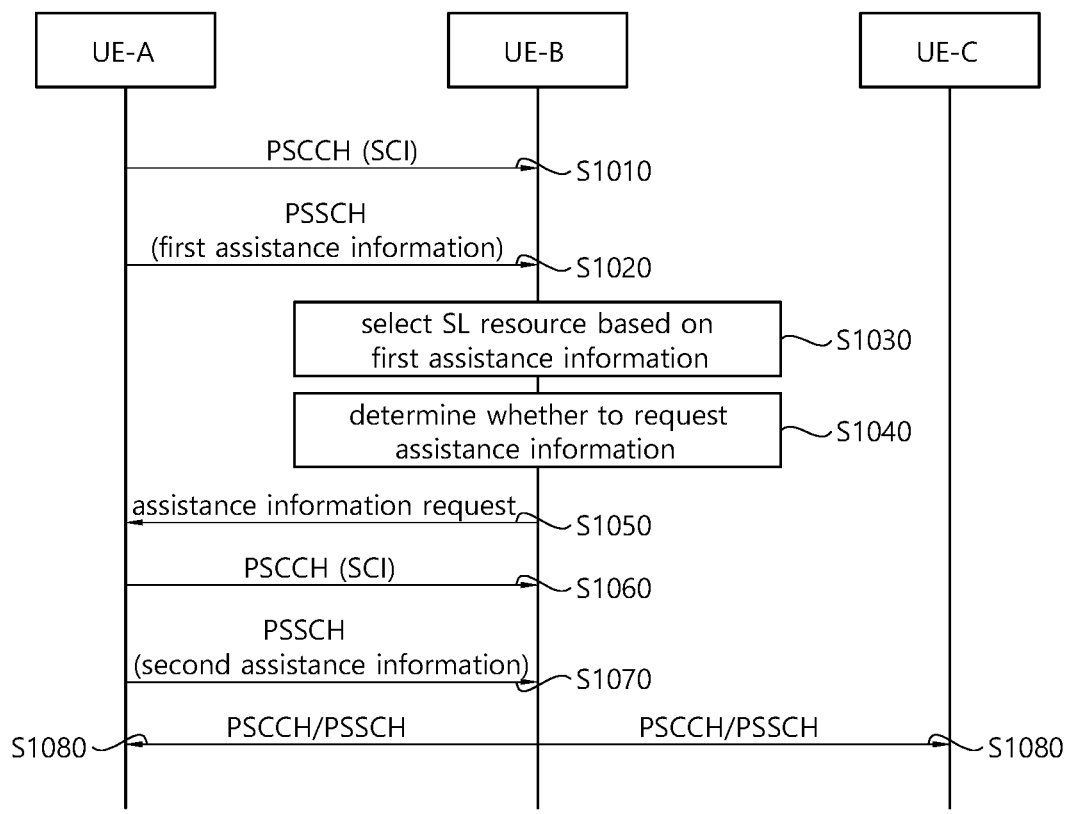
FIG. 10 shows a procedure for a UE to perform SL communication based on assistance information, based on an embodiment of the present disclosure.

FIG. 10 shows a procedure for a UE to perform SL communication based on assistance information, based on an embodiment of the present disclosure. The embodiment of FIG. 10 may be combined with various embodiments of the present disclosure.

Referring to FIG. 10, in step S1010, the UE-A may transmit SCI to the UE-B through a PSCCH. For example, the SCI may include information for scheduling a PSSCH.

In step S1020, the UE-A may transmit first assistance information to the UE-B through a PSSCH. For example, the first assistance information may be included in a MAC PDU. For example, the first assistance information may include information proposed in various embodiments of the present disclosure. For example, the first assistance information may include information related to excluding resource(s) and/or candidate resource(s). For example, the candidate resource may be a resource which is preferred by the UE-A. For example, the excluding resource may be a resource which is not preferred by the UE-A. For example, the candidate resource may be a resource which is preferred by the UE-C. For example, the excluding resource may be a resource which is not preferred by the UE-C. For example, the UE-B may receive information related to resource(s) preferred by other UEs (i.e., candidate resource(s)) and/or information related to resource(s) not preferred by other UEs (i.e., excluding resource(s)) from the UE-A.

In step S1030, the UE-B may select an SL resource based on the first assistance information. For example, in case that the UE-B operates in a power saving mode, the UE-B that has received the inter-UE coordination message may perform the following operation.

In case that the UE-B selects a resource based on random selection, since there is no sensing result, the UE-B may perform resource selection based on all sensing results received from the UE-A.

In case that the UE-B performs partial sensing, there is no partial sensing result. Thus, if a sensing result received from the UE-A is a sensing result for a resource not sensed by the UE-B, the UE-B may perform resource selection by considering both the result value received from the UE-A and the result value obtained by the UE-B based on the sensing.

In step S1040, the UE-B may determine whether to request assistance information. For example, the UE-B may determine whether to request additional assistance information. For example, if resource reselection is performed after the UE-B receives the inter-UE coordination message, step S1050 may be performed.

In step S1050, the UE-B may inform that resource reselection has been performed. For example, the UE-B may inform UE-A that resource reselection has been performed. For example, the UE-B may request (re)transmission of an inter-UE coordination message. For example, the UE-B may transmit information for requesting (re)transmission of an inter-UE coordination message to the UE-A.

For example, if the UE-A receives the request from the UE-B or resource reselection is performed, the UE-A may perform the following procedure.

If the information related to excluding resource(s) and/or candidate resource(s) (or the sensing result) transmitted by the UE-A is the same, the UE-A may skip (periodic or event-based) retransmission. In this case, for example, steps S1060 and S1070 may be skipped.

If the information related to excluding resource(s) and/or candidate resource(s) (or the sensing result) transmitted by the UE-A is not the same, the UE-A may perform (periodic or event-based) retransmission once or multiple times. In this case, for example, in step S1060, the UE-A may transmit SCI to the UE-B through a PSCCH. For example, the SCI may include information for scheduling a PSSCH. In step S1070, the UE-A may transmit second assistance information to the UE-B through the PSSCH. For example, the second assistance information may be included in a MAC PDU. For example, the second assistance information may include information proposed in various embodiments of the present disclosure. For example, the second assistance information may include information related to excluding resource(s) and/or candidate resource(s). For example, the candidate resource may be a resource which is preferred by the UE-A. For example, the excluding resource may be a resource which is not preferred by the UE-A. For example, the candidate resource may be a resource which is preferred by the UE-C. For example, the excluding resource may be a resource which is not preferred by the UE-C. For example, the UE-B may receive information related to resource(s) preferred by other UEs (i.e., candidate resource(s)) and/or information related to resource(s) not preferred by other UEs (i.e., excluding resource(s)) from the UE-A.

In step S1080, the UE-B may select an SL resource based on the first assistance information and/or the second assistance information. In addition, the UE-B may transmit a PSCCH and/or a PSSCH to the UE-A or the UE-C based on the SL resource.

Based on an embodiment of the present disclosure, the UE-B and/or the UE-A may skip decoding. For example, in case that the UE-A (e.g., RX UE, RX UE performing power saving or SL DRX operation) signals information related to non-preferred (time/frequency) resource(s) (or resource(s) that should be avoided) (hereinafter referred to as NOT_REFRSC) to the UE-B (e.g., TX UE) in terms of (time/frequency) resources used for packet transmission of the UE-B, it may be allowed for the UE-A to skip attempting to decode a PSCCH (and/or a PSSCH (e.g. data, 2nd SCI)) (of the related service transmitted by the UE-B) on the signaled NOT_REFRSC. Herein, for example, from the perspective of the UE-A, NOT_REFRSC may be at least one of a resource used for SL transmission of the UE-A, a resource used for UL transmission of the UE-A, a resource for which interference equal to or higher than a pre-configured threshold level is measured, and/or a resource already used for packet transmission of the TX UE related to (ongoing) other SL communication. For example, whether or not to configure/apply the rule may be configured differently or independently based on a priority of the related service. For example, whether or not to configure/apply the rule may be configured differently or independently based on a type of the related service. For example, whether or not to configure/apply the rule may be configured differently or independently based on a QoS requirement of the related service.

For example, whether or not to configure/apply the rule may be configured differently or independently based on a cast type. For example, whether or not to configure/apply the rule may be configured differently or independently based on whether SL HARQ feedback is enabled. For example, whether or not to configure/apply the rule may be configured differently or independently based on whether SL HARQ feedback is disabled. For example, whether or not to configure/apply the rule may be configured differently or independently based on a SL HARQ feedback type (e.g., NACK only feedback). For example, whether or not to configure/apply the rule may be configured differently or independently based on an interference/congestion level on a resource pool.

Meanwhile, after the UE-A transmits information related to candidate resource(s) to the UE-B, the UE-B may select a transmission resource based on the received resource information. In this case, after the UE-A transmits information related to candidate resource(s) based on a candidate message, the UE-B may receive information related to candidate resource(s) again from the UE-A during transmission after the UE-B selects the transmission resource. In this case, there is no defined behavior for what to do with the current transmission resource. The present disclosure solves this problem.

Procedure 1. The UE-A may transmit an inter-UE coordination message for inter-device coordination under the following condition(s), and the UE-A may include information related to candidate resource(s) in the coordination message and transmit it.

Procedure 2. The UE-B which has received information related to candidate resource(s) may select a transmission resource based on this, and the UE-B may perform SL communication with the UE-A. For example, the UE-B which has received information related to candidate resource(s) may select a transmission resource based on this, and the UE-B may perform one shot transmission or multiple transmissions based on the selected transmission resource.

Procedure 3. If the UE-B receives information related to candidate resource(s) (e.g., a set of resources) (i.e., an inter-UE coordination message) from the UE-A while performing a plurality of transmissions, the UE-B may perform at least one of the following procedures. For example, in consideration of DRX on-duration of the UE-A, the UE-B may preferentially exclude resource(s) in anticipation that the UE-A has high interference in the on-duration.

The UE-B may perform resource reselection.

The UE-B may perform resource reselection only if at least one of the following conditions is satisfied. For example, if a set of (partial or all) resources newly received from the UE-A is related to data with a high priority, and/or if a set of (partial or all) resources received from the UE-A is related to a service with a high priority, the UE-B may perform resource reselection.

If the UE-B receives information related to candidate resource(s) (e.g., resource information considered for transmission resource selection), the UE-B may perform transmission resource reselection (partially) only for other resources, excluding the same resource among resources currently selected and used for transmission. For example, the UE-B may perform transmission resource reselection by preferentially considering resources considered for selection of newly received transmission resources. For example, the UE-B may perform transmission resource reselection (partially) based on preemption.

If the UE-B receives information related to candidate resource(s) (e.g., resource information excluded from transmission resource selection), the UE-B may perform transmission resource reselection (partially) only for the same resource, excluding other resources among resources currently selected and used for transmission. For example, the UE-B may perform transmission resource reselection by preferentially excluding resources excluded from selection of newly received transmission resources.

After the UE-B uses all resources currently selected and used for transmission, the UE-B may perform resource reselection.

In addition, if the UE-B receives information related to candidate resource(s) (e.g., a set of resources) (i.e., an inter-UE coordination message) from the UE-A again while performing a plurality of transmissions, the UE-B may operate according to the following rule(s).

For example, while the UE-B is performing transmission resource selection/reservation based on "SET OF RESOURCE" (RSC_SETPAST) received from the UE-A, if the UE-B receives (from the UE-A or other UEs (participating in the same service)) "SET OF RESOURCE" (RSC_SETFUTURE) that is (partially) different from the previously received "SET OF RESOURCE" (and/or RSC_SETFUTURE not including (partially) transmission resource(s) currently selected/reserved by the UE-B (e.g., if SET OF RESOURCE is resource(s) preferred by the UE-A as transmission resource(s)/reception resource(s) of the UE-B, it is referred to as CASE A) and/or RSC_SETFUTURE including (partially) transmission resource(s) currently selected/reserved by the UE-B (e.g., if SET OF RESOURCE is resource(s) non-preferred by the UE-A as transmission resource(s)/reception resource(s) of the UE-B, it is referred to as CASE B)), the UE-B may be configured to perform the following operation. Herein, for example, "SET OF RESOURCE" (e.g., RSC_SETPAST, RSC_SETFUTURE) transmitted by the UE-A to the UE-B may be extended to and interpreted as on-duration period information (related to SL DRX operation) preferred by the UE-A (and/or received by the UE-A from the base station (or other UE)). In this case, if (partial) transmission resources currently selected/reserved by the UE-B are not (partially) included in the (updated) on-duration period transmitted through RSC_SETFUTURE (e.g., similar to CASE A), the following (partial) rules may apply.

[Rule A]: Reselect all currently selected/reserved transmission resources (within RSC_SETFUTURE (e.g., CASE A) or outside RSC_SETFUTURE (e.g., CASE B)), and/or

[Rule B]: Among currently selected/reserved transmission resources, reselect only those that do not belong to RSC_SETFUTURE (within RSC_SETFUTURE) (e.g., CASE A) (or reselect only those that belong to RSC_SETFUTURE (outside RSC_SETFUTURE) (e.g., CASE B)), and/or

[Rule C]: In case that, along with RSC_SETFUTURE, a service priority/type targeted by this (and/or requirement) information (TARGET_PRIINFO) (and/or transmission-related packet priority (INF_PRIINFO) information that causes the (highest) interference on the corresponding resource (and/or UE type information (e.g., P-UE, V-UE) and/or UE sensing type information (e.g., no sensing, partial sensing, full sensing))) is signaled, if UE-B's priority related to packets (and/or participating services) transmitted based on a currently selected/reserved resource is lower than TARGET_PRIINFO (and/or INF_PRIINFO) (and/or if a UE type that causes the (highest) interference on RSC_SETFUTURE is P-UE and/or if a UE that causes the (highest) interference on RSC_SETFUTURE performed random (or partial (or full) sensing)-based resource selection) and if RSC_SETFUTURE and the currently selected/reserved resource of the UE-B overlap (partially), the UE-B may apply the rule B for the overlapping resource (or apply the rule A for all resources), and/or

[Rule D]: Perform transmission resource reselection/reservation based on RSC_SETFUTURE (or among resources within RSC_SETFUTURE (e.g., CASE A) (or outside RSC_SETFUTURE (e.g., CASE B))) if transmission resource reselection/reservation is triggered based on whether a pre-configured rule/condition is satisfied, and/or

[Rule E]: Perform transmission resource reselection/reservation based on RSC_SETFUTURE (or among resources within RSC_SETFUTURE (e.g., CASE A) (or outside RSC_SETFUTURE (e.g., CASE B))) if ongoing TB transmission completes (and/or if a pre-configured (SL GRANT SPECIFIC) timer completes), and/or

[Rule F]: In case that Rule D (and/or Rule E) is applied, (exceptionally) use RSC_SETFUTURE (or (still) RSC_SETPAST) if preemption-based resource reselection is performed for (partial) transmission resources currently selected/reserved (and/or if resource reselection is performed in order to compensate for TX transmission omission due to UL-SL prioritization, congestion control, etc.) even before transmission resource reselection/reservation is triggered based on a pre-configured rule/condition (and/or even before ongoing TB transmission completes and/or even before a pre-configured (SL grant specific) timer expires), and/or

[Rule G]: After RSC_SETFUTURE is received, transmission resource selection/reservation related to a newly created SL grant may be configured to use RSC_SETFUTURE.

For example, if the following (some) conditions are satisfied, the UE may request transmission of an (updated) inter-UE coordination message, and/or perform (or stop) transmitting an (updated) inter-UE coordination message, and/or assume that an inter-UE coordination message received on a previous resource pool is invalid.

If the UE switches between a normal (transmission) pool and an exceptional (transmission) pool (e.g., this is because interference characteristics of the exceptional pool in which random selection/reservation of transmission resources is performed may be different from that of the normal (transmission) pool (in which (partial/full) sensing-based transmission resource selection/reservation is performed), and/or If the UE switches between a (transmission) pool in which full (and/or partial) sensing-based (and/or only full (and/or partial) sensing-based) transmission resource selection/reservation is allowed and a (transmission) pool in which random-based (and/or only random-based) transmission resource selection/reservation is allowed (and/or if the UE switches between a (transmission) pool in which full sensing-based (and/or only full sensing-based) transmission resource selection/reservation is allowed and a (transmission) pool in which partial sensing-based (and/or only partial sensing-based) transmission resource selection/reservation is allowed), and/or If the UE performs (re)selection/reservation of periodic resources for multiple MAC PDU transmissions (or (re)selection/reservation of resource(s) for single MAC PDU transmission)

For example, if a UE is vulnerable to battery consumption (and/or has the amount of remaining battery less than a pre-configured threshold) (and/or if a UE performs a partial sensing operation (and/or does not perform a sensing operation and/or performs random transmission resource selection/reservation) and/or if a UE performs sensing during a time shorter than a pre-configured threshold and/or if a UE has limited (RF chain) capability (e.g., a UE that does not have a (separate) RF chain for SL RX, a UE that shares an RF chain for SL/Uu communication) and/or if a UE has a pre-configured type (e.g., pedestrian UE)), the UE may be configured to:

not perform an operation of transmitting (and/or receiving) an inter-UE coordination message, and/or perform limitedly an operation of transmitting (and/or receiving) an inter-UE coordination message only if the UE participates in communication related to a service with a higher priority than a pre-configured threshold level (and/or with a tight requirement (e.g., latency, reliability)), and/or only transmit an inter-UE coordination message based on pre-configured information (e.g., information on reception resource(s) preferred by the UE/transmission resource(s) information of other UEs, which does not cause a half-duplex problem).

For example, depending on a cast type (e.g., unicast, groupcast, broadcast) (and/or service priority/type/requirement), whether or not the UE-B can select a resource other than "SET OF RESOURCE" received from the UE-A (and/or the maximum number of increments of an SL RSRP threshold (MAX_RSRPINC_NUM) used for IDLE resource determination/sensing operation (and/or the maximum increment value (MAX_RSRPINC_VAL)) in order to secure the number of IDLE resources above a pre-configured threshold ratio within "SET OF RESOURCE" received from the UE-A) may be configured differently. Herein, for example, unlike the case of unicast, in the case of groupcast (and/or broadcast) with a relatively large number of (potential) UEs capable of performing transmission operations on the received "SET OF RESOURCE", it may be configured to be able to select a resource other than "SET OF RESOURCE", and/or MAX_RSRPINC_NUM (and/or MAX_RSRPINC_VAL) may be configured to a relatively small value in order to early/quickly select a resource other than "SET OF RESOURCE".

Herein, as an example, for SET OF RESOURCE received from the UE-A, if the UE-B fails to secure the number of IDLE resources greater than or equal to a pre-configured threshold ratio (within SET OF RESOURCE) despite reaching MAX_RSRPINC_NUM (and/or MAX_RSRPINC_VAL) (and/or if it is impossible to select resources that satisfies a minimum time gap required for SL HARQ feedback-based retransmission (e.g., the sum of the time difference between an initial/preceding transmission time and a PSFCH reception time and a minimum processing time required between the PSFCH reception time and a retransmission time) and/or if it is impossible to select a retransmission resource reserved from a prior SCI and/or if it is impossible to select the required number of transmission resources for TB transmission), the UE-B may be configured to inform the UE-A of such status information through pre-configured signaling (e.g., PC5, MAC CE) (e.g., upon receiving this, the UE-A transmits an updated inter-UE coordination message to the UE-B), and/or the UE-B may be configured to request transmission of an updated inter-UE coordination message to the UE-A, and/or the UE-B may be allowed (implicitly) to select a resource other than "SET OF RESOURCE".

For example, if the RX UE receives an inter-UE coordination message (and/or an SL DRX pattern message and/or wake-up signaling) (ASS_MSG) from the TX UE, the RX UE may report information on reception/decoding success or failure to the TX UE (through a PSFCH). Herein, as an example, whether to apply the corresponding reporting operation may be specifically/differently configured for each resource pool (and/or (associated/target) service priority/type/requirement and/or congestion/interference level (e.g., CBR) (of a resource pool) and/or cast type). Also, as an example, if the above rule applies, it may be interpreted that ASS_MSG transmission is limitedly performed on a resource pool in which a PSFCH resource is configured. As another example, only if the received ASS_MSG-related L2 (source and/or destination) ID (and/or a pre-configured ASS_MSG-SPECIFIC SPECIAL ID) (in a MAC header) matches that of a service of interest (and/or that of a target UE), the RX UE may consider that ASS_MSG is valid.

For example, whether the (some) proposed method/rule is applied or not and/or the related parameter (e.g., threshold) may be configured specifically (or differently or independently) based on a resource pool, a (resource pool) congestion/interference level, a (related) service priority/type (and/or a requirement (e.g., latency, reliability)), a traffic type (e.g., (a)periodic generation), an SL mode, a cast type, etc.

Procedure 4. The UE-B may inform the UE-A that resource reselection has been performed.

Hereinafter, exceptional conditions will be described.

Procedure 3. Even if the UE-A transitions to an exceptional condition state after transmitting an inter-UE coordination message to the UE-B, the UE-A may continue to transmit an inter-UE coordination message.

Procedure 4. If the UE-B also transitions to an exceptional condition, the UE-B may inform the UE-A that it has also transitioned to the exceptional condition.

Procedure 5. Based on a resource selected/to be selected from an exceptional pool by the UE-A, the UE-A may transmit information for excluding transmission resource selection to the UE-B.

Based on various embodiments of the present disclosure, after the UE-A transmits information related to candidate resource(s) to other UEs, if the UE-A additionally transmits information related to candidate resource(s) while the UE-B performs transmission based on this, the UE-B may partially or entirely reselect resources.

Whether or not the (some) proposed method/rule of the present disclosure is applied or not and/or the related parameter (e.g., threshold) may be configured specifically (or differently or independently) based on a resource pool, a congestion level, a service priority (and/or type), a requirement (e.g., latency, reliability), a traffic type (e.g., (a)periodic generation), an SL mode, etc.

Figure 11:
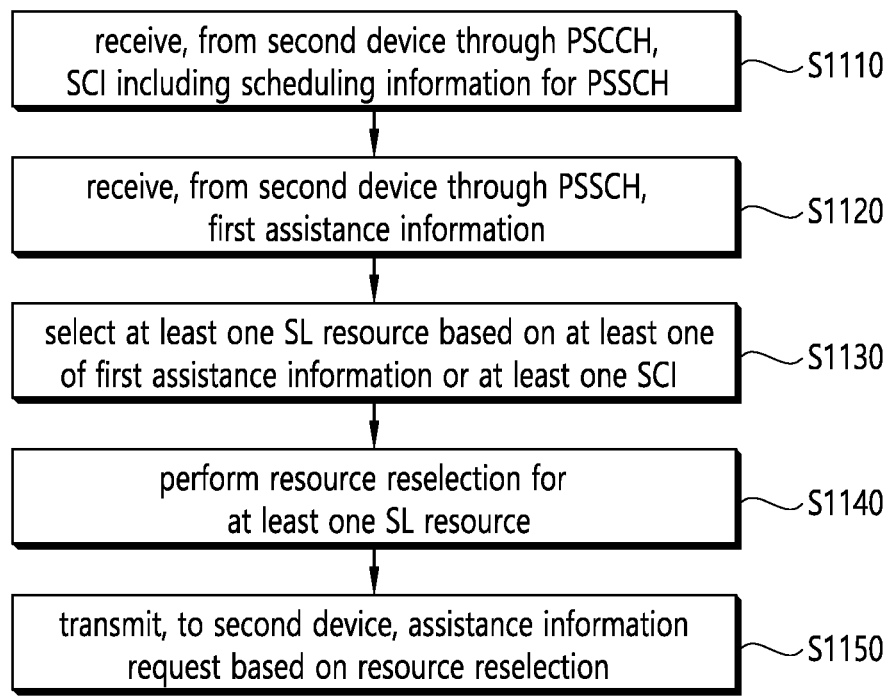
FIG. 11 shows a method of performing wireless communication by a first device, based on an embodiment of the present disclosure.

FIG. 11 shows a method of performing wireless communication by a first device, based on an embodiment of the present disclosure. The embodiment of FIG. 11 may be combined with various embodiments of the present disclosure.

Referring to FIG. 11, in step S1110, the first device may receive, from a second device through a physical sidelink control channel (PSCCH), sidelink control information (SCI) including scheduling information for a physical sidelink shared channel (PSSCH). For example, the SCI may include information related to frequency resource assignment, information related to time resource assignment, information related to a demodulation reference signal (DMRS) pattern, and information related to a modulation and coding scheme (MCS). In step S1120, the first device may receive, from the second device through the PSSCH, first assistance information. In step S1130, the first device may select at least one sidelink (SL) resource based on at least one of the first assistance information or at least one SCI. In step S1140, the first device may perform resource reselection for the at least one SL resource. In step S1150, the first device may transmit, to the second device, an assistance information request based on the resource reselection.

For example, based on random selection-based resource selection performed by the first device, the assistance information request may be information for requesting a result of full sensing performed by the second device.

For example, based on partial sensing-based resource selection performed by the first device, the assistance information request may be information for requesting a result of sensing, performed by the second device, for a region in which the first device does not perform sensing. For example, the assistance information request may include information related to the region in which the first device does not perform sensing.

For example, based on random selection-based resource selection performed by the first device, the at least one SL resource may be selected by the first device based only on the first assistance information.

For example, based on partial sensing-based resource selection performed by the first device, the at least one SL resource may be selected based on the first assistance information and a result of sensing obtained based on the at least one SCI.

For example, the assistance information request may be information for informing the resource reselection or information for requesting transmission of assistance information.

Additionally, for example, the first device may receive, from the second device, second assistance information in response to the assistance information request, based on a difference between the first assistance information and the second assistance information.

For example, based on that the first assistance information and second assistance information may be same, the second assistance information is not transmitted by the second device in response to the assistance information request. Additionally, for example, the first device may determine that the first assistance information is valid assistance information, based on that the first device does not receive the second assistance information from the second device within a specific time interval after transmitting the assistance information request to the second device.

For example, the first assistance information may include information related to a non-preferred resource by the second device. For example, based on that SL transmission is performed by the first device on the non-preferred resource, the second device may be allowed to skip decoding for the SL transmission. For example, the non-preferred resource may include at least one of a resource for SL transmission of the second device, a resource for uplink (UL) transmission of the second device, a resource for which interference greater than or equal to a pre-configured threshold level is measured, or a resource for SL transmission of a third device.

The proposed method can be applied to the device(s) based on various embodiments of the present disclosure. First, the processor 102 of the first device 100 may control the transceiver 106 to receive, from a second device through a physical sidelink control channel (PSCCH), sidelink control information (SCI) including scheduling information for a physical sidelink shared channel (PSSCH). For example, the SCI may include information related to frequency resource assignment, information related to time resource assignment, information related to a demodulation reference signal (DMRS) pattern, and information related to a modulation and coding scheme (MCS). In addition, the processor 102 of the first device 100 may control the transceiver 106 to receive, from the second device through the PSSCH, first assistance information. In addition, the processor 102 of the first device 100 may select at least one sidelink (SL) resource based on at least one of the first assistance information or at least one SCI. In addition, the processor 102 of the first device 100 may perform resource reselection for the at least one SL resource. In addition, the processor 102 of the first device 100 may control the transceiver 106 to transmit, to the second device, an assistance information request based on the resource reselection.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); receive, from the second device through the PSSCH, first assistance information; select at least one sidelink (SL) resource based on at least one of the first assistance information or at least one SCI; perform resource reselection for the at least one SL resource; and transmit, to the second device, an assistance information request based on the resource reselection.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, from a second UE through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); receive, from the second UE through the PSSCH, first assistance information; select at least one sidelink (SL) resource based on at least one of the first assistance information or at least one SCI; perform resource reselection for the at least one SL resource; and transmit, to the second UE, an assistance information request based on the resource reselection.

Based on an embodiment of the present disclosure, a non-transitory computer-readable storage medium storing instructions may be provided. For example, the instructions, when executed, may cause a first device to: receive, from a second device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); receive, from the second device through the PSSCH, first assistance information; select at least one sidelink (SL) resource based on at least one of the first assistance information or at least one SCI; perform resource reselection for the at least one SL resource; and transmit, to the second device, an assistance information request based on the resource reselection.

Figure 12:
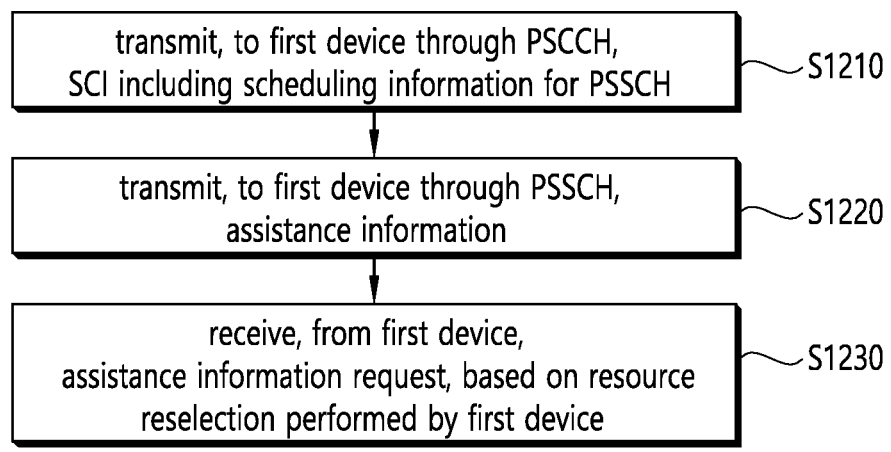
FIG. 12 shows a method for a second device to perform wireless communication, based on an embodiment of the present disclosure.

FIG. 12 shows a method for a second device to perform wireless communication, based on an embodiment of the present disclosure. The embodiment of FIG. 12 may be combined with various embodiments of the present disclosure.

Referring to FIG. 12, in step S1210, the second device may transmit, to a first device through a physical sidelink control channel (PSCCH), sidelink control information (SCI) including scheduling information for a physical sidelink shared channel (PSSCH). For example, the SCI may include information related to frequency resource assignment, information related to time resource assignment, information related to a demodulation reference signal (DMRS) pattern, and information related to a modulation and coding scheme (MCS). In step S1220, the second device may transmit, to the first device through the PSSCH, assistance information. In step S1230, the second device may receive, from the first device, an assistance information request, based on resource reselection performed by the first device.

The proposed method can be applied to the device(s) based on various embodiments of the present disclosure. First, the processor 202 of the second device 200 may control the transceiver 206 to transmit, to a first device through a physical sidelink control channel (PSCCH), sidelink control information (SCI) including scheduling information for a physical sidelink shared channel (PSSCH). For example, the SCI may include information related to frequency resource assignment, information related to time resource assignment, information related to a demodulation reference signal (DMRS) pattern, and information related to a modulation and coding scheme (MCS). In addition, the processor 202 of the second device 200 may control the transceiver 206 to transmit, to the first device through the PSSCH, assistance information. In addition, the processor 202 of the second device 200 may control the transceiver 206 to receive, from the first device, an assistance information request, based on resource reselection performed by the first device.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); transmit, to the first device through the PSSCH, assistance information; and receive, from the first device, an assistance information request, based on resource reselection performed by the first device.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: transmit, to a first UE through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); transmit, to the first UE through the PSSCH, assistance information; and receive, from the first UE, an assistance information request, based on resource reselection performed by the first UE.

Based on an embodiment of the present disclosure, a non-transitory computer-readable storage medium storing instructions may be provided. For example, the instructions, when executed, may cause a second device to: transmit, to a first device through a physical sidelink control channel (PSCCH), sidelink control information (SCI) including scheduling information for a physical sidelink shared channel (PSSCH), wherein the SCI includes information related to frequency resource assignment, information related to time resource assignment, information related to a demodulation reference signal (DMRS) pattern, and information related to a modulation and coding scheme (MCS); transmit, to the first device through the PSSCH, assistance information; and receive, from the first device, an assistance information request, based on resource reselection performed by the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
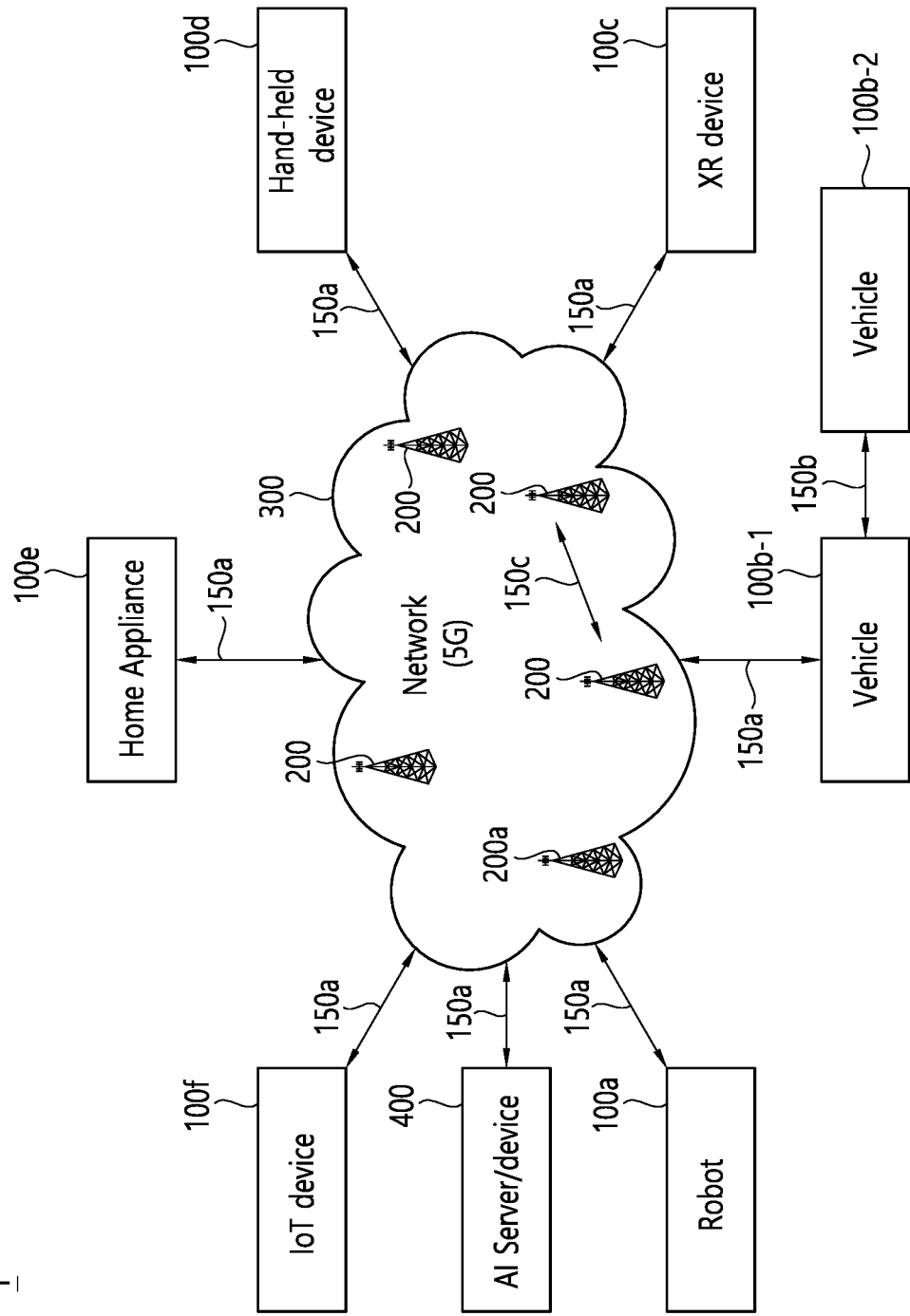
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
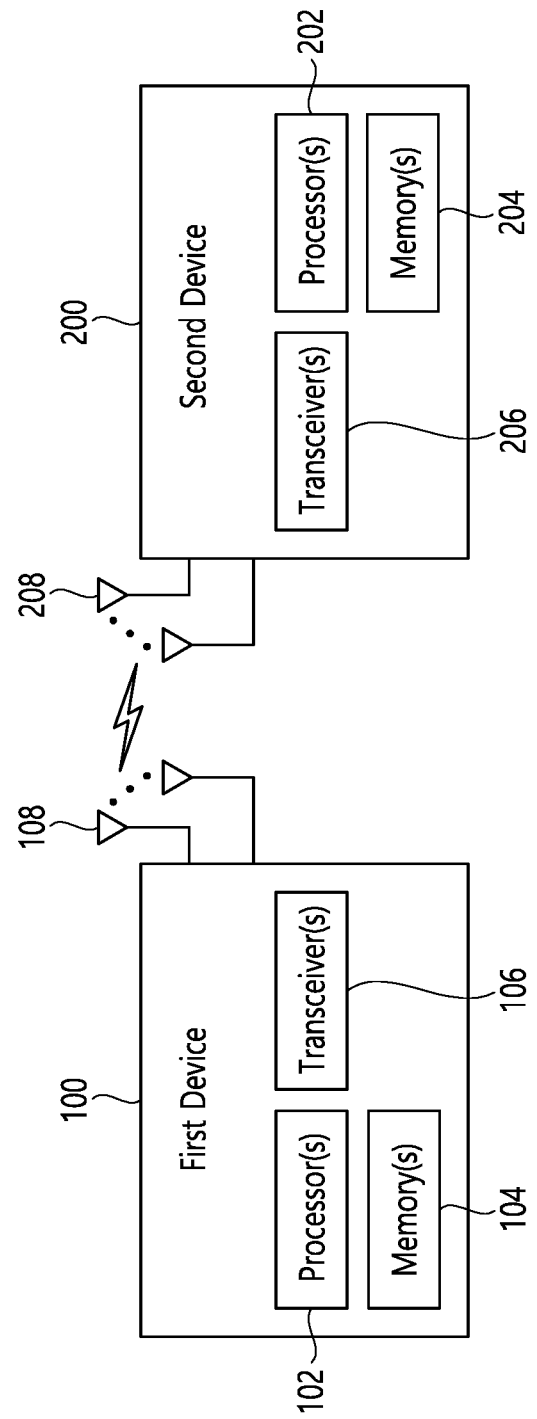
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
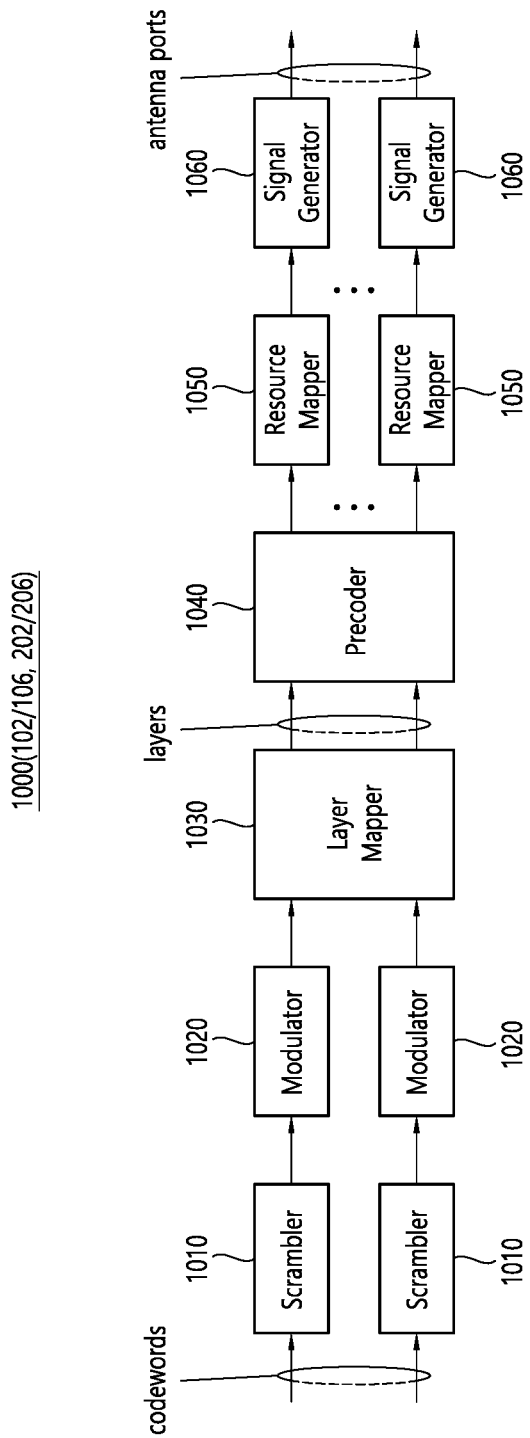
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
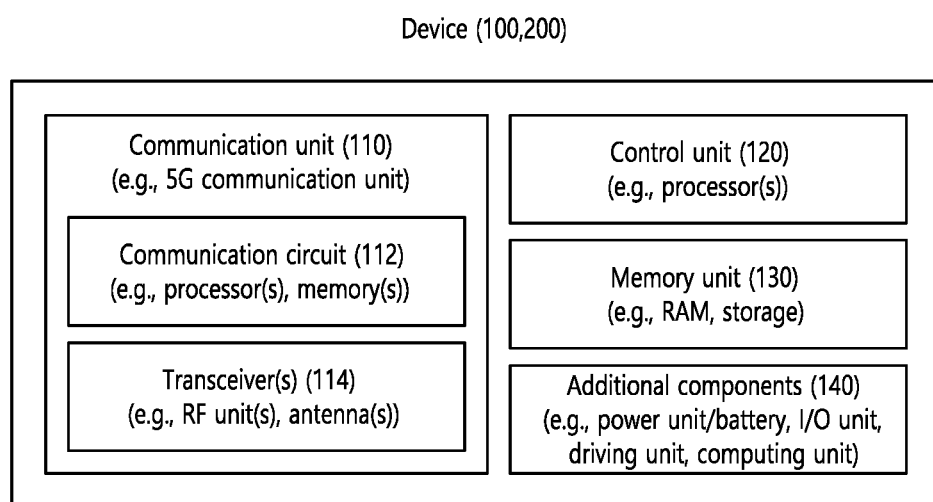
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

Hereinafter, an example of implementing FIG. 16 will be described in detail with reference to the drawings.

Figure 17:
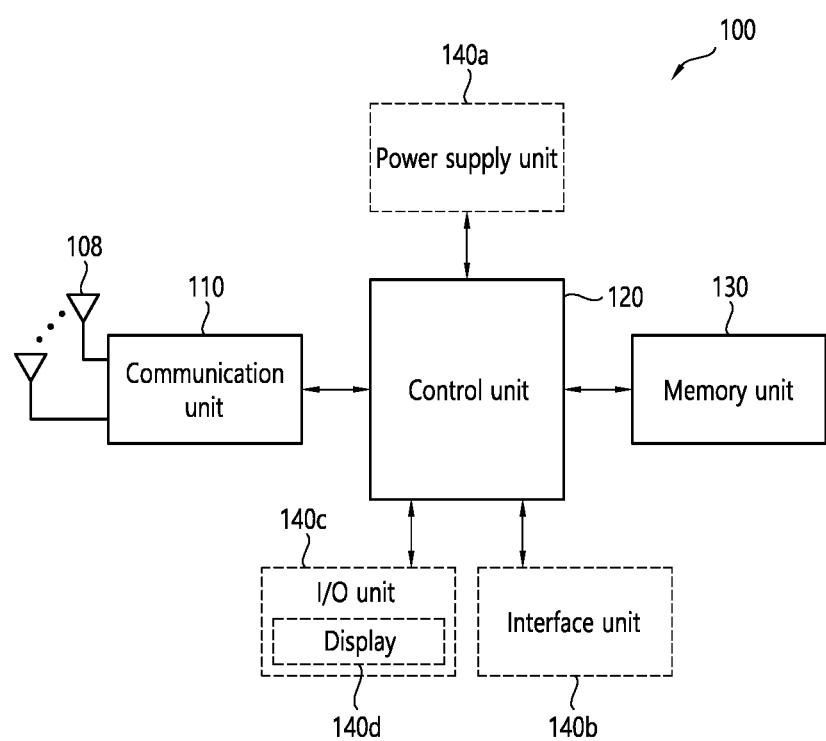
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
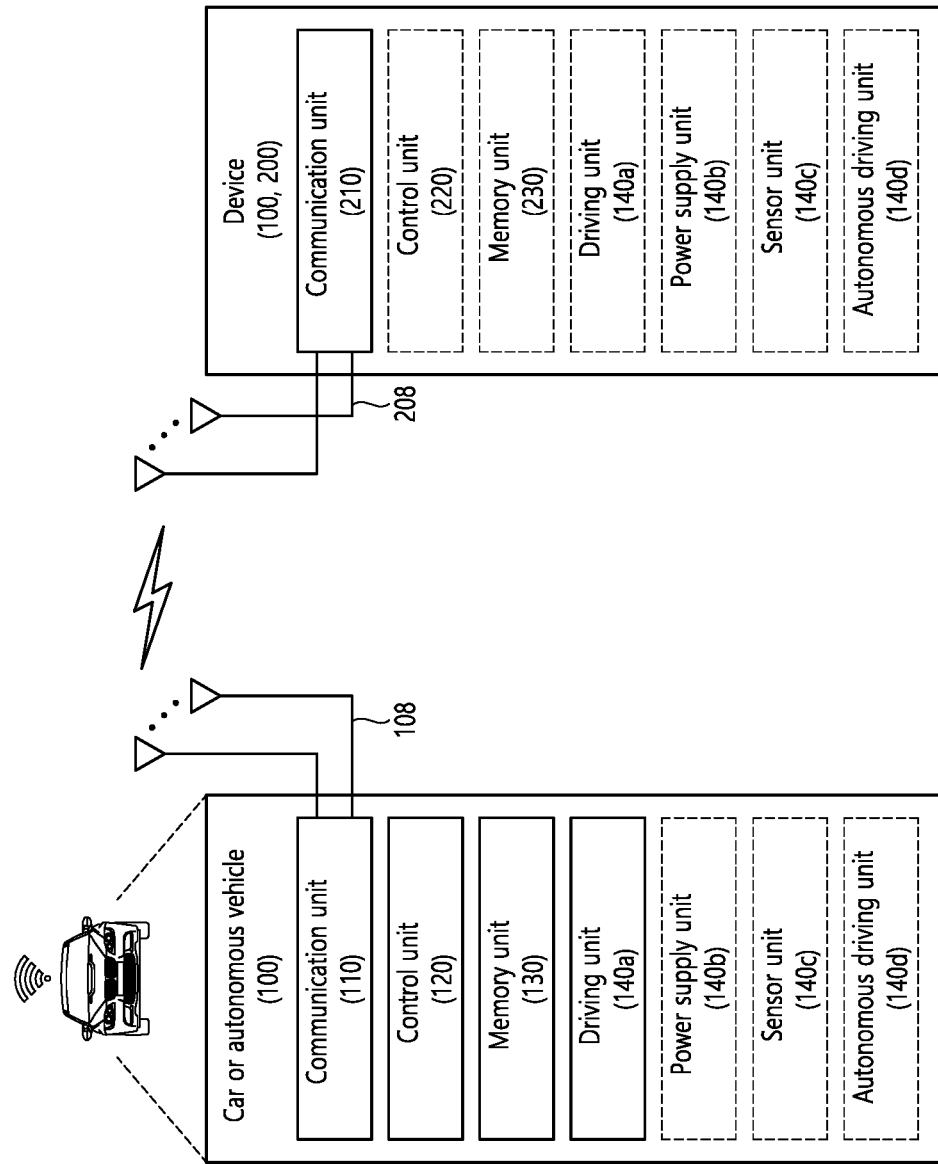
FIG. 18 shows a vehicle or an autonomous vehicle, based on an embodiment of the present disclosure.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   obtaining a sidelink (SL) discontinuous reception (DRX) configuration related to a SL active time;
   receiving, from a second device through a physical sidelink control channel (PSCCH), sidelink control information (SCI) including scheduling information for a physical sidelink shared channel (PSSCH),
   wherein the SCI includes information related to frequency resource assignment, information related to time resource assignment, information related to a demodulation reference signal (DMRS) pattern, and information related to a modulation and coding scheme (MCS);
   receiving, from the second device, first inter-UE coordination information including information regarding a set of preferred resources or information regarding a set of non-preferred resources;
   selecting at least one SL resource based on the first inter-UE coordination information; and
   triggering resource reselection, based on the selected at least one SL resource not being in the SL active time.

2. The method of claim 1, further comprising:
   transmitting, to the second device, an inter-UE coordination information request based on the triggering of the resource reselection.

3. The method of claim 2,
   wherein, based on random selection-based resource selection performed by the first device, the inter-UE coordination information request is information for requesting a result of full sensing performed by the second device, and
   wherein, based on partial sensing-based resource selection performed by the first device, the inter-UE coordination information request is information for requesting a result of sensing, performed by the second device, for a region in which the first device does not perform sensing.

4. The method of claim 3, wherein the inter-UE coordination information request includes information related to the region in which the first device does not perform sensing.

5. The method of claim 1, wherein, based on random selection-based resource selection performed by the first device, the at least one SL resource is selected by the first device based only on the first inter-UE coordination information.

6. The method of claim 1, wherein, based on partial sensing-based resource selection performed by the first device, the at least one SL resource is selected based on the first inter-UE coordination information and a result of sensing obtained based on at least one SCI.

7. The method of claim 2, wherein the inter-UE coordination information request is information for informing the resource reselection or information for requesting transmission of inter-UE coordination information.

8. The method of claim 2, further comprising:
   receiving, from the second device, second inter-UE coordination information in response to the inter-UE coordination information request, based on a difference between the first inter-UE coordination information and the second inter-UE coordination information.

9. The method of claim 2, wherein, based on the first inter-UE coordination information and second inter-UE coordination information are the same, the second inter-UE coordination information is not transmitted by the second device in response to the inter-UE coordination information request.

10. The method of claim 9, further comprising:
    determining that the first inter-UE coordination information is valid inter-UE coordination information, based on the first device not receiving the second inter-UE coordination information from the second device within a specific time interval after transmitting the inter-UE coordination information request to the second device.

11. The method of claim 1, wherein, based on transmission is performed by the first device on a resource within the set of non-preferred resources, the second device is allowed to skip decoding for the SL transmission.

12. The method of claim 1, wherein the set of non-preferred resources includes at least one of a resource for SL transmission of the second device, a resource for uplink (UL) transmission of the second device, a resource for which interference greater than or equal to a pre-configured threshold level is measured, or a resource for SL transmission of a third device.

13. A first device adapted to perform wireless communication, the first device comprising:
    one or more processors;
    one or more transceivers; and
    one or more memories storing instructions that, based on being executed, cause the one or more processors to perform operations comprising:
    obtaining a sidelink (SL) discontinuous reception (DRX) configuration related to a SL active time;
    receiving, from a second device through a physical sidelink control channel (PSCCH), sidelink control information (SCI) including scheduling information for a physical sidelink shared channel (PSSCH),
    wherein the SCI includes information related to frequency resource assignment, information related to time resource assignment, information related to a demodulation reference signal (DMRS) pattern, and information related to a modulation and coding scheme (MCS);
    receiving, from the second device, first inter-UE coordination information including information regarding a set of preferred resources or information regarding a set of non-preferred resources;
    selecting at least one SL resource based on the first inter-UE coordination information; and
    triggering resource reselection, based on the selected at least one SL resource not being in the SL active time.

14. The first device of claim 13, wherein the operations further comprise transmitting, to the second device, an inter-UE coordination information request based on the triggering of the resource reselection.

15. The first device of claim 14,
wherein, based on random selection-based resource selection performed by the first device, the inter-UE coordination information request is information for requesting a result of full sensing performed by the second device, and
wherein, based on partial sensing-based resource selection performed by the first device, the inter-UE coordination information request is information for requesting a result of sensing, performed by the second device, for a region in which the first device does not perform sensing.

16. The first device of claim 15, wherein the inter-UE coordination information request includes information related to the region in which the first device does not perform sensing.

17. A processing device adapted to control a first device, the processing device comprising:
one or more processors; and
one or more memories operably connected to the one or more processors and storing instructions that, based on being executed, cause the one or more processors to perform operations comprising:
obtaining a sidelink (SL) discontinuous reception (DRX) configuration related to a SL active time;
receiving, from a second device through a physical sidelink control channel (PSCCH), sidelink control information (SCI) including scheduling information for a physical sidelink shared channel (PSSCH),
wherein the SCI includes information related to frequency resource assignment, information related to time resource assignment, information related to a demodulation reference signal (DMRS) pattern, and information related to a modulation and coding scheme (MCS);
receiving, from the second device, first inter-UE coordination information including information regarding a set of preferred resources or information regarding a set of non-preferred resources;
selecting at least one SL resource based on the first inter-UE coordination information; and
triggering resource reselection, based on the selected at least one SL resource not being in the SL active time.

18. The processing device of claim 17, wherein the operations further comprise transmitting, to the second device, an inter-UE coordination information request based on the triggering of the resource reselection.

19. The processing device of claim 18,
wherein, based on random selection-based resource selection performed by the first device, the inter-UE coordination information request is information for requesting a result of full sensing performed by the second device, and
wherein, based on partial sensing-based resource selection performed by the first device, the inter-UE coordination information request is information for requesting a result of sensing, performed by the second device, for a region in which the first device does not perform sensing.

20. The processing device of claim 19, wherein the inter-UE coordination information request includes information related to the region in which the first device does not perform sensing.

* * * * *